United States Patent
Takahashi et al.

(10) Patent No.: US 10,779,279 B2
(45) Date of Patent: Sep. 15, 2020

(54) WIRELESS STATION, NETWORK DEVICE, CONTROL METHOD, STORAGE MEDIUM STORING PROGRAM, AND COMMUNICATION SYSTEM FOR CALCULATING AN AVAILABLE BANDWIDTH IN A WIRELESS LINK

(71) Applicant: NEC Corporation, Tokyo (JP)

(72) Inventors: Eiji Takahashi, Tokyo (JP); Kosei Kobayashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 62 days.

(21) Appl. No.: 16/091,589

(22) PCT Filed: Apr. 5, 2017

(86) PCT No.: PCT/JP2017/014177
§ 371 (c)(1),
(2) Date: Oct. 5, 2018

(87) PCT Pub. No.: WO2017/175781
PCT Pub. Date: Oct. 12, 2017

(65) Prior Publication Data
US 2019/0132842 A1   May 2, 2019

(30) Foreign Application Priority Data

Apr. 8, 2016   (JP) ................................. 2016-077734

(51) Int. Cl.
*H04W 72/04*   (2009.01)
*H04W 24/08*   (2009.01)
(Continued)

(52) U.S. Cl.
CPC ...... *H04W 72/0453* (2013.01); *H04B 17/309* (2015.01); *H04B 17/318* (2015.01);
(Continued)

(58) Field of Classification Search
CPC ..... H04W 24/08; H04W 24/10; H04W 84/12; H04W 88/02; H04W 40/12; H04W 52/24;
(Continued)

(56) References Cited

U.S. PATENT DOCUMENTS

| | | | | |
|---|---|---|---|---|
| 2007/0195715 A1* | 8/2007 | Yamano | ................ | H04W 40/04 370/254 |
| 2014/0334318 A1* | 11/2014 | Pica | ...................... | H04W 36/14 370/252 |
| 2017/0332294 A1* | 11/2017 | Miyagoshi | ............ | H04W 36/08 |

FOREIGN PATENT DOCUMENTS

JP   2009-017275 A   1/2009

OTHER PUBLICATIONS

Dovrolis, et al., "Packet-dispersion techniques and a capacity-estimation methodology", IEEE/ACM Transactions on Networking, Dec. 2004, pp. 963-977, vol. 12, No. 6 (15 pages total).
(Continued)

*Primary Examiner* — Peter Chen
(74) *Attorney, Agent, or Firm* — Sughrue Mion, PLLC

(57) ABSTRACT

[Problem] To estimate an open band in a wireless link precisely without imposing a communication load.

[Solution] An open band in a wireless link is calculated from the bandwidth for a wireless link between a first wireless station and a second wireless station, a radio resource utilization rate, which is the ratio of the number of frequency blocks used for signal transmission with respect to the multiple frequency blocks constituting the bandwidth, and the radio quality of the wireless link.

11 Claims, 19 Drawing Sheets

(51) Int. Cl.
  *H04B 17/309* (2015.01)
  *H04B 17/318* (2015.01)
  *H04B 17/336* (2015.01)
  *H04W 88/02* (2009.01)
  *H04W 72/08* (2009.01)

(52) U.S. Cl.
  CPC .......... *H04B 17/336* (2015.01); *H04W 24/08* (2013.01); *H04W 72/082* (2013.01); *H04W 88/02* (2013.01)

(58) Field of Classification Search
  CPC . H04W 52/243; H04W 52/267; H04W 52/72; H04W 52/02; H04W 52/04; H04W 52/08; H04W 52/042; H04W 52/082; H04W 52/085; H04W 52/0453; H04W 52/0446; H04W 52/0413; H04W 52/0406; H04W 52/0473; H04W 52/1231; H04L 1/20; H04L 1/0026; H04L 5/001; H04L 5/0007; H04L 5/0023; H04L 5/006; H04L 43/08; H04L 47/14; H04B 7/0626; H04B 7/0632
  See application file for complete search history.

(56) References Cited

OTHER PUBLICATIONS

Takahashi, et al., "A Data Transfer Method Using Fragmental Low Load Intervals of LTE Base Station", Technical Report of the Institute of Electronics, Information and Communication Engineers, Mar. 19, 2015, pp. 103-108, vol. 114, No. 523, paragraph 2 (7 pages total).

Suzuki, et al., "An LTE Cell Load Estimation Method Based on Radio Quality Information of a User Equipment", Proceedings of the 2016 Institute of Electronics, Information and Communication Engineers General Conference 2016, Communication (1), Mar. 15, 2016, paragraph 2 (2 pages total).

International Search Report of PCT/JP2017/014177 dated May 23, 2017.

Written Opinion of the International Searching Authority of PCT/JP2017/014177 dated May 23, 2017.

* cited by examiner

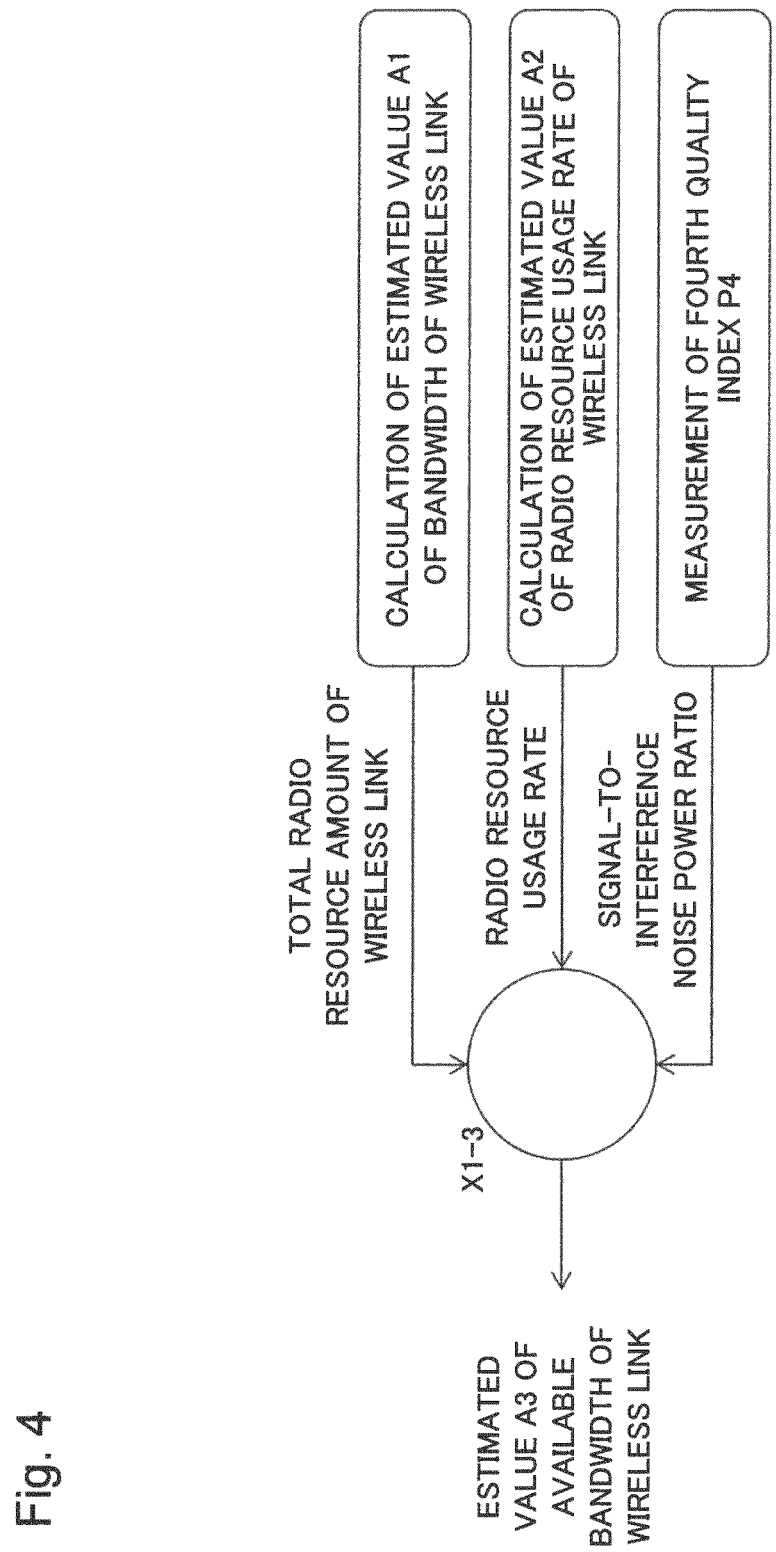

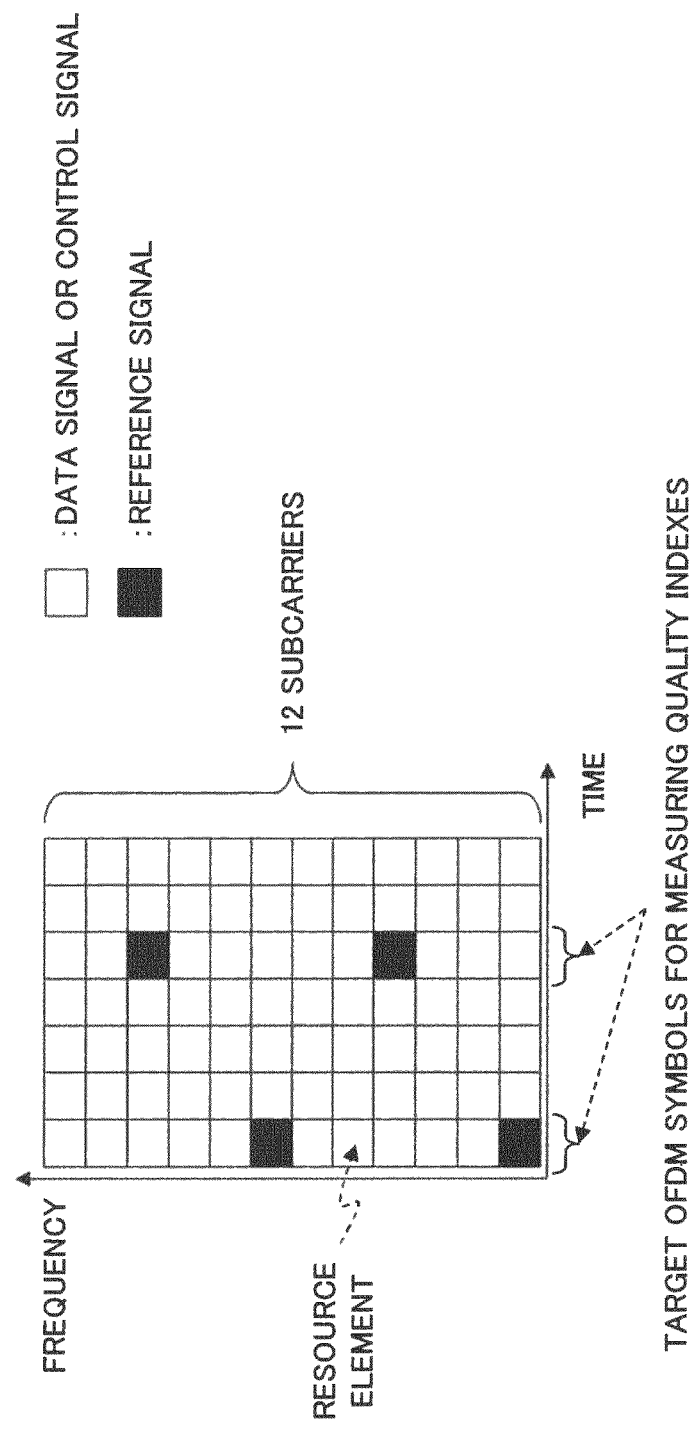

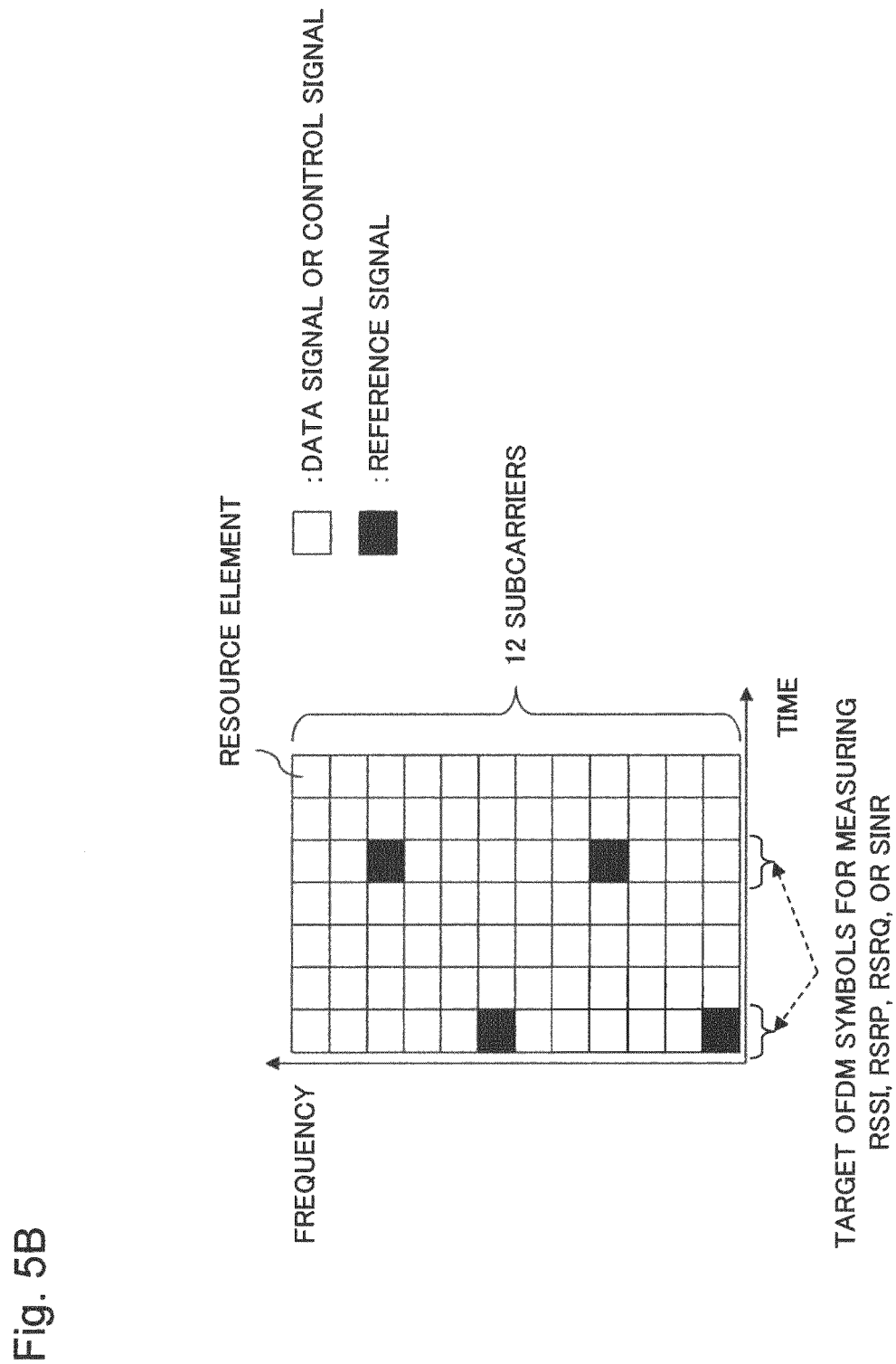

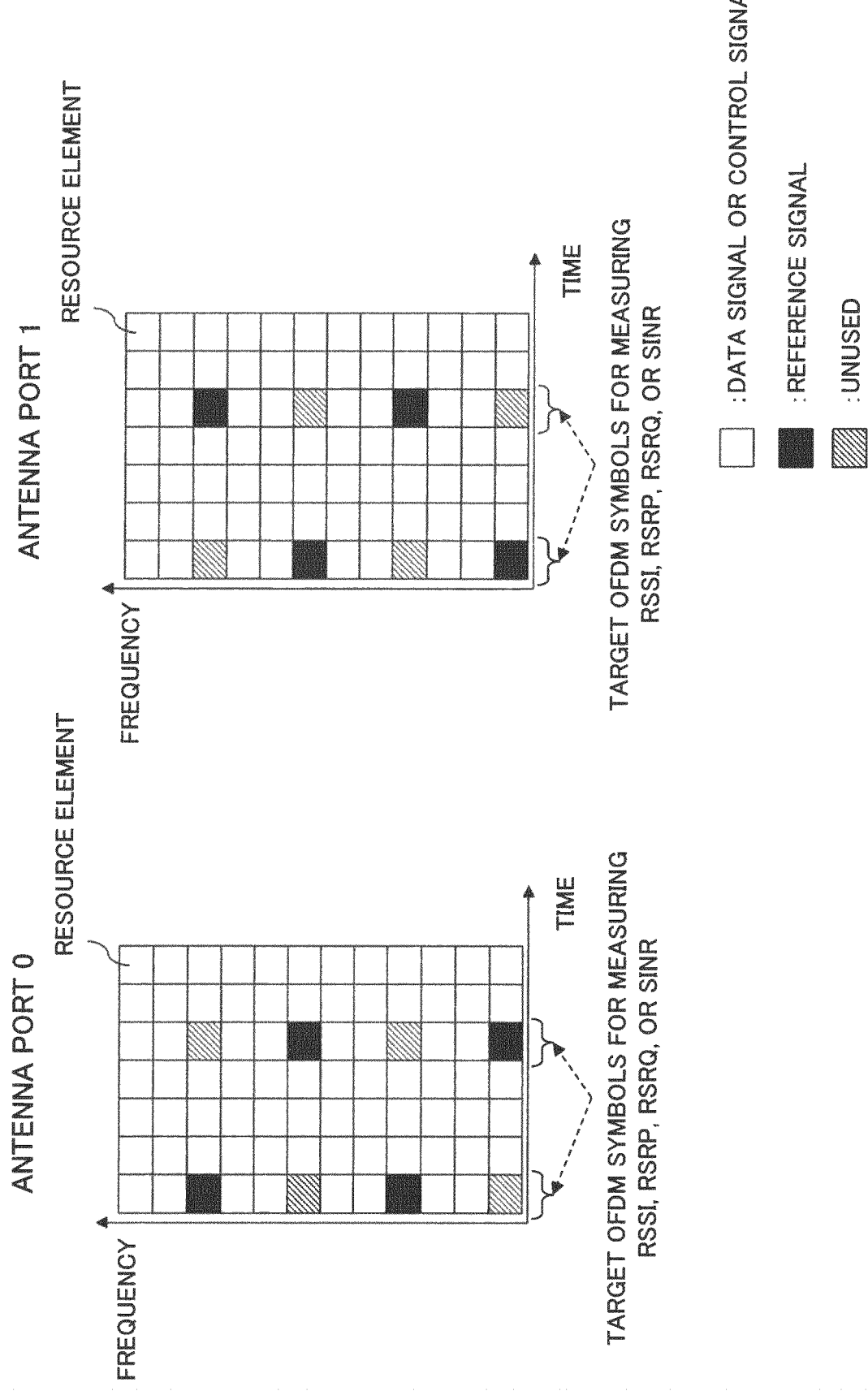

Fig. 7

| CQI | VALUE OF SINR[dB] (DESCRIBED AS S BELOW) |
|---|---|
| 0 | $S < -3.5$ dB |
| 1 | $-3.5$ dB $\leq S < -2.5$ dB |
| 2 | $-2.5$ dB $\leq S < -1.5$ dB |
| 3 | $-1.5$ dB $\leq S < -0.5$ dB |
| ... | ... |
| 30 | $25.5$ dB $\leq S$ |

Fig. 8

| CQI | TOTAL NUMBER OF RESOURCE BLOCKS | Modulation | Payload size |
|---|---|---|---|
| 0 | 25 | QPSK | 137 |
| 1 | 25 | QPSK | 173 |
| 2 | 25 | 16QAM | 233 |
| 3 | 25 | 16QAM | 317 |
| ... | ... | ... | ... |
| 30 | 25 | 64QAM | 7168 |

Fig. 9

| CQI | THROUGHPUT PER RESOURCE BLOCK [MBIT/S] |
|---|---|
| 0 | 0.0 |
| 1 | 0.1 |
| 2 | 0.12 |
| 3 | 0.15 |
| 4 | 0.2 |
| 5 | 0.25 |
| ... | ... |
| 30 | 60 |

Fig. 10

| VALUE OF SINR[dB] (DESCRIBED AS S BELOW) | THROUGHPUT PER RESOURCE BLOCK[Mbit/s] |
|---|---|
| $S < -3.5$ dB | 0.0 |
| $-3.5$ dB $\leq S < -2.5$ dB | 0.1 |
| $-2.5$ dB $\leq S < -1.5$ dB | 0.12 |
| $-1.5$ dB $\leq S < -0.5$ dB | 0.15 |
| ... | ... |
| $25.5$ dB $\leq S$ | 60 |

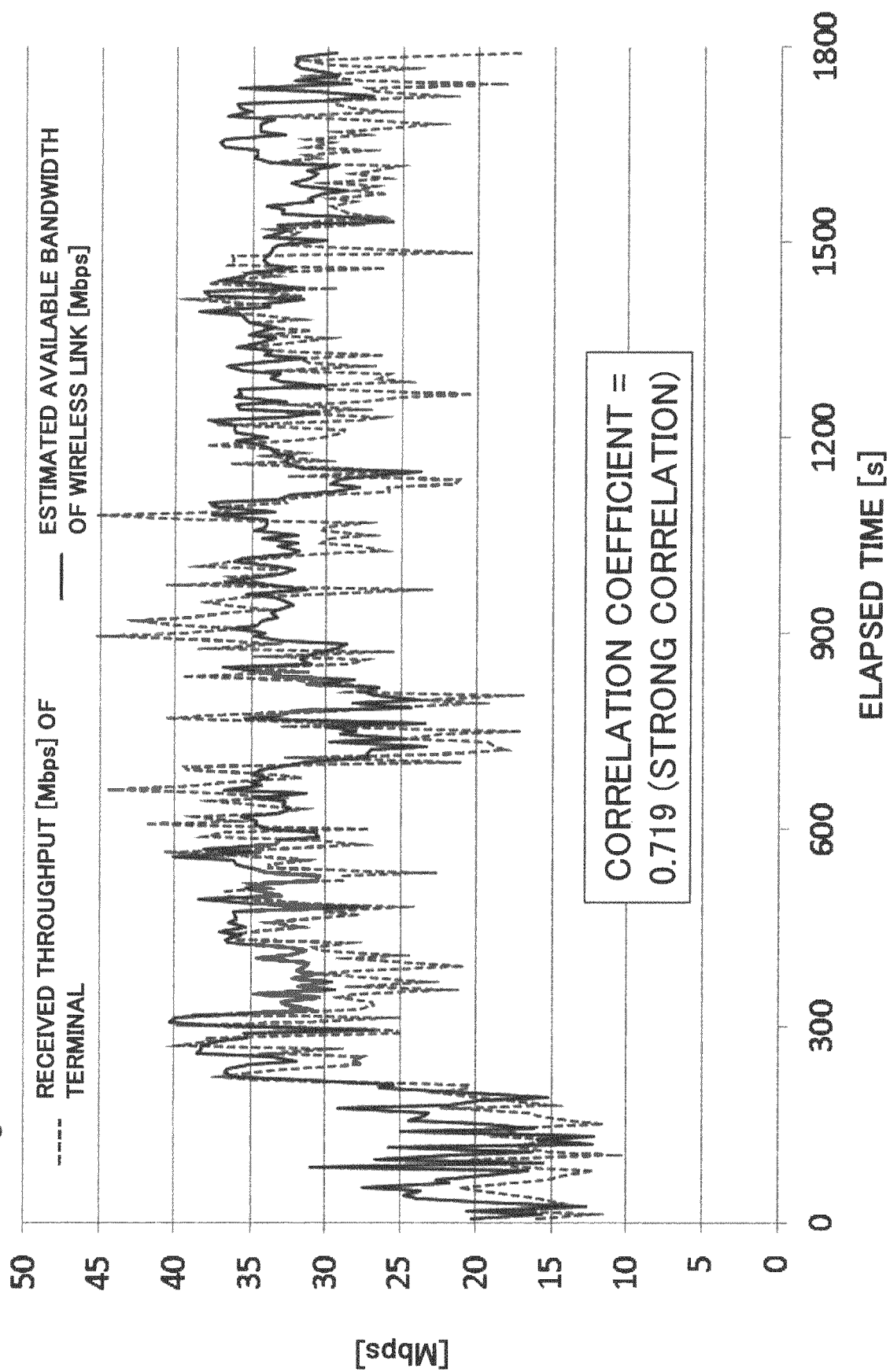

WIRELESS STATION, NETWORK DEVICE, CONTROL METHOD, STORAGE MEDIUM STORING PROGRAM, AND COMMUNICATION SYSTEM FOR CALCULATING AN AVAILABLE BANDWIDTH IN A WIRELESS LINK

CROSS REFERENCE TO RELATED APPLICATIONS

This application is a National Stage of International Application No. PCT/JP2017/014177 filed Apr. 5, 2017, claiming priority based on Japanese Patent Application No. 2016-077734 filed Apr. 8, 2016, the disclosure of which is incorporated herein in its entirety by reference.

TECHNICAL FIELD

The present disclosure relates to a wireless station, a network device, a control method, and a program.

BACKGROUND ART

In a mobile network, a traffic having a high real-time characteristic such as Web browsing, video viewing, or communication is handled. Moreover, not only a traffic having a high real-time characteristic, but also various kinds of traffics such as a traffic having a low real-time characteristic including content downloading and application updating are equally handled in a mixed and undistinguished manner. Thus, there has been a problem that communication quality of all traffics deteriorates when a peak load is generated.

There is an off-peak data transfer technique of transferring a traffic having a low real-time characteristic such as content downloading by utilizing an available bandwidth of a wireless link. The off-peak data transfer technique makes it possible to equalize a peak load in a wireless link without deteriorating communication quality of a traffic having a high real-time characteristic such as Web browsing.

The off-peak data transfer technique has an issue of how precisely an available bandwidth (a currently available bandwidth, e.g., a value represented by bit/s) in a wireless link is estimated.

Furthermore, in a mobile network, in order to improve communication quality of a wireless link and maintain sufficient communication service quality, a network operator needs to investigate communication quality in a communication area, adjusts various parameters, and thereby improve the communication quality. Herein, communication quality refers to, for example, an available bandwidth of a wireless link, or the like.

Regarding a technique of estimating an available bandwidth, for example, NPL 1 discloses a method of sending out a measurement packet called a probe to a measurement target network, and, by use of information (such as one-way transfer delay time) thereby obtained, estimating an available bandwidth.

CITATION LIST

Non-Patent Literature

[NPL 1] "Packet-dispersion techniques and a capacity-estimation methodology" written by C. Dovrolis, P. Ramanathan, D. Moore, IEEE/ACM Transactions on Networking, Volume 12, Issue 6, pp. 963-977, December, 2004

SUMMARY OF INVENTION

Technical Problem

A first problem is that, in a system according to NPL 1, it is not possible to precisely calculate an available bandwidth of a wireless link between a wireless base station and a measurement terminal. A reason for this is that the system according to NPL 1 operates in such a way as to estimate an available bandwidth of a bottleneck line between a measurement terminal and a measurement server, and therefore can not necessarily calculate an available bandwidth of a wireless link.

A second problem is that, in the method according to NPL 1, a communication load for measurement is imposed on a measurement terminal and a measurement target network. A reason for this is that it is necessary to send out a measurement packet to the measurement target network when estimating an available bandwidth.

Thus, in view of the problems described above, an exemplary embodiment is intended to provide a new arrangement which makes it possible to precisely calculate an available bandwidth in a wireless link while suppressing a communication load on a measurement terminal and a measurement target network.

Solution to Problem

A wireless station according to an exemplary embodiment comprises a processor. The processor is configured to calculate an available bandwidth in a wireless link from a bandwidth for the wireless link between a wireless station and another wireless station, a radio resource usage rate which is a ratio of a number of frequency blocks used for signal transfer, to a plurality of frequency blocks constituting the bandwidth, and radio quality of the wireless link.

A network device according to another exemplary embodiment is configured to be able to communicate with a second wireless station connected to a first wireless station via a wireless link. The network device comprises a processor. The processor is configured to calculate an available bandwidth in the wireless link from a bandwidth for the wireless link, a radio resource usage rate which is a ratio of a number of frequency blocks used for signal transfer, to a plurality of frequency blocks constituting the bandwidth, and radio quality of the wireless link.

A control method according to another exemplary embodiment comprises calculating an available bandwidth in a wireless link from a bandwidth for the wireless link between a first wireless station and a second wireless station, a radio resource usage rate which is a ratio of a number of frequency blocks used for signal transfer, to a plurality of frequency blocks constituting the bandwidth, and radio quality of the wireless link.

A program according to another exemplary embodiment causes a computer to calculate an available bandwidth in a wireless link from a bandwidth for the wireless link between a first wireless station and a second wireless station, a radio resource usage rate which is a ratio of a number of frequency blocks used for signal transfer, to a plurality of frequency blocks constituting the bandwidth, and radio quality of the wireless link.

Advantageous Effects of Invention

According to an exemplary embodiment, it is possible to precisely calculate an available bandwidth of a wireless link while suppressing a communication load.

BRIEF DESCRIPTION OF DRAWINGS

FIG. 4 is a schematic diagram of a method of calculating an estimated value A3 of an available bandwidth of a wireless link in FIG. 1.

FIG. 5A is an explanatory diagram illustrating one example of a resource block configuration of a symbol targeted for measurement of quality indices such as total received power, reference signal received power, reference signal received quality, and a signal-to-interference noise power ratio of a reference signal.

FIG. 5B illustrates one example of a resource block configuration when a number of antennas is 1.

FIG. 5C illustrates one example of a resource block configuration when a number of antennas is 2.

FIG. 7 is a table illustrating an example of a correspondence relation between a channel quality indicator (CQI) and a signal-to-interference plus noise power ratio (SINR).

FIG. 8 is a table illustrating an example of a correspondence relation between a CQI, a total number of resource blocks, and a payload size per resource block.

FIG. 9 is a table illustrating an example of a correspondence relation between a CQI and throughput per resource block.

FIG. 10 is a table illustrating an example of a correspondence relation between an SINR and throughput per resource block.

FIG. 17 is a graph illustrating a result of an experiment of estimating an available bandwidth of a wireless link.

EXAMPLE EMBODIMENT

Overview of Exemplary Embodiment

Next, an exemplary embodiment is presented with reference to the drawings. In the respective drawings, identical or corresponding elements are given identical reference signs, and for clarification of a description, a repeated description is omitted as needed. A plurality of exemplary embodiments described below can be independently implemented, or suitably implemented in combination.

Figure 1:
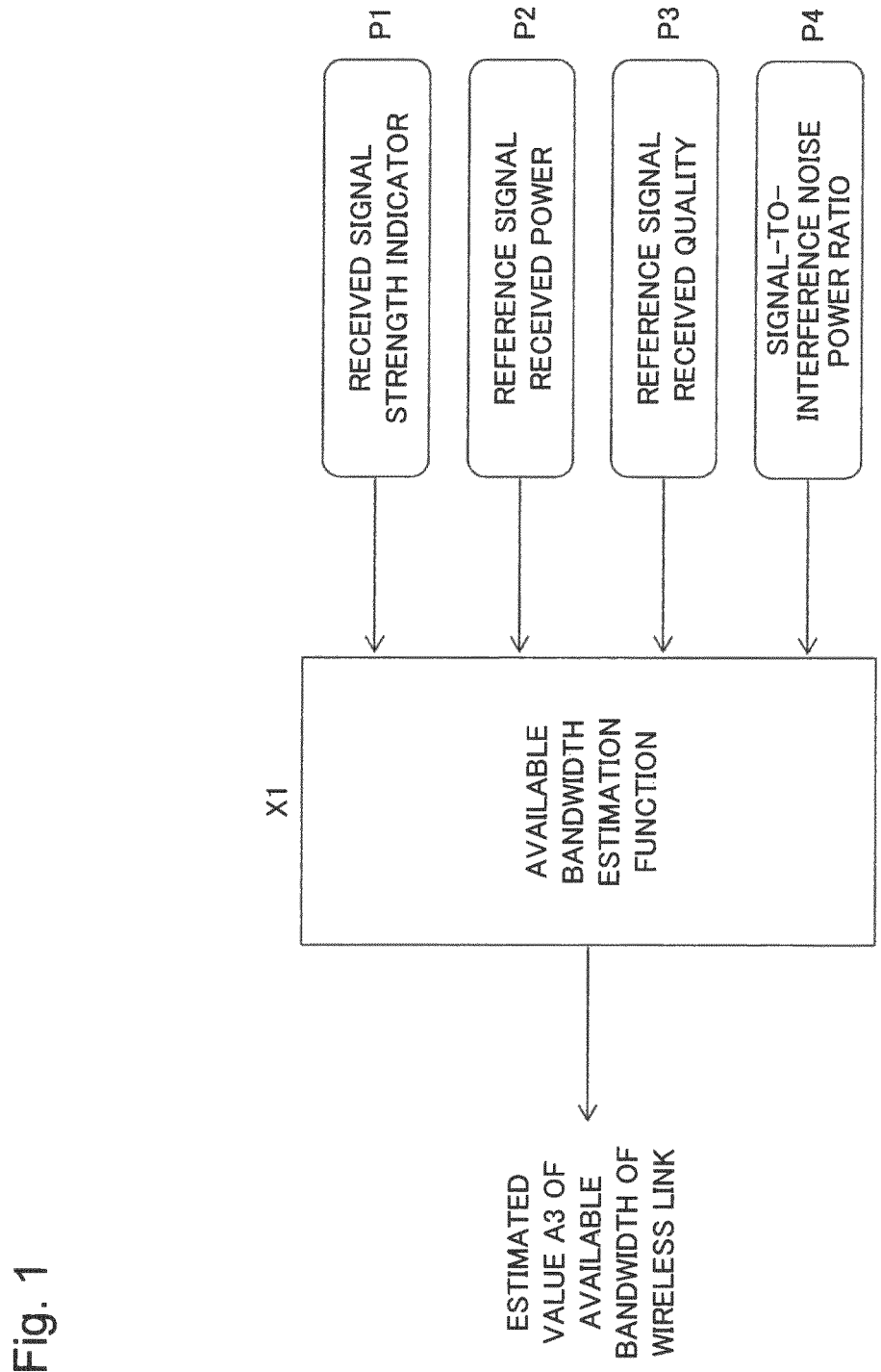
FIG. 1 is a conceptual configuration diagram regarding a band estimation system according to an exemplary embodiment.

As illustrated in FIG. 1, according to the present example embodiment, an available bandwidth estimation function X1 calculates (and/or estimates) an available bandwidth of a wireless link by use of at least one of a first quality index P1 including total received power measured by a wireless station, a second quality index P2 including reference signal received power, a third quality index P3 including reference signal received quality, and a fourth quality index P4 including a signal-to-interference noise power ratio of the reference signal.

Herein, a wireless station is a device having a wireless communication function in a wireless communication system. Note that a wireless station may be a wireless terminal, a user terminal, a mobile station, a user equipment (UE), a wireless base station, an evolved Node B (eNodeB or eNB), or the like.

The first quality index P1 including the total received power (received signal strength) is, for example, a received signal strength indicator (RSSI) and the like. The second quality index P2 including the reference signal received power is, for example, reference signal received power (RSRP) and the like. The third quality index P3 including the reference signal received quality is, for example, reference signal received quality (RSRQ) and the like. The fourth quality index P4 including the signal-to-interference noise power ratio of the reference signal is, for example, a signal-to-interference plus noise power ratio (SINR) and the like.

The available bandwidth estimation function X1 may be provided in, for example, a wireless station or a network upper device managing a wireless station. The available bandwidth estimation function X1 executes an available bandwidth estimation described next.

<Available Bandwidth Estimation>

Figure 2:
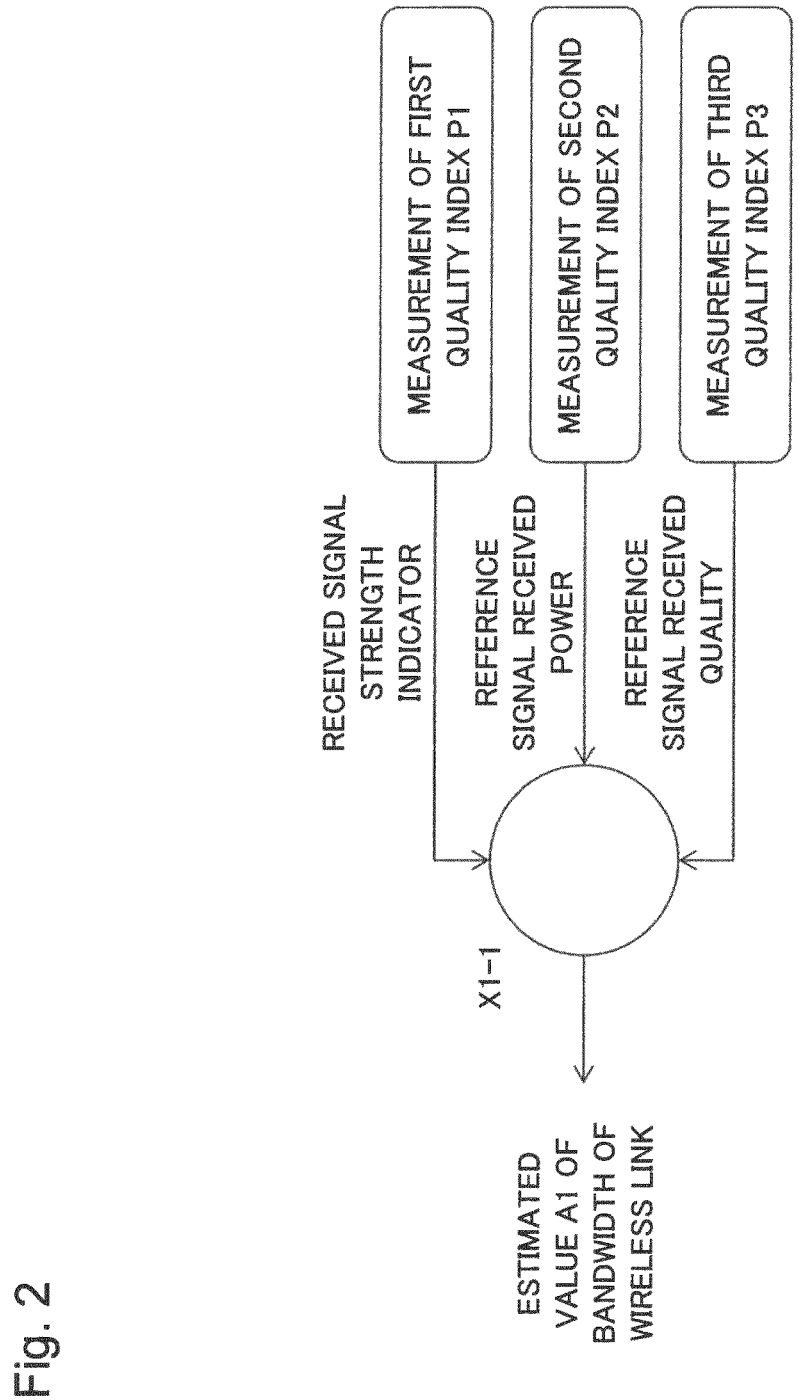
FIG. 2 is a schematic diagram of a method of calculating an estimated value A1 of a bandwidth of a wireless link in FIG. 1.

FIG. 2 is a schematic diagram of a method of calculating an estimated value A1 of a bandwidth of a wireless link in an exemplary embodiment. In FIG. 2, an available bandwidth estimation function X1-1 calculates the estimated value A1 of the bandwidth of the wireless link by use of the first quality index P1 including the total received power measured at the wireless station, the second quality index P2 including the reference signal received power, and the third quality index P3 including the reference signal received quality.

Figure 3:
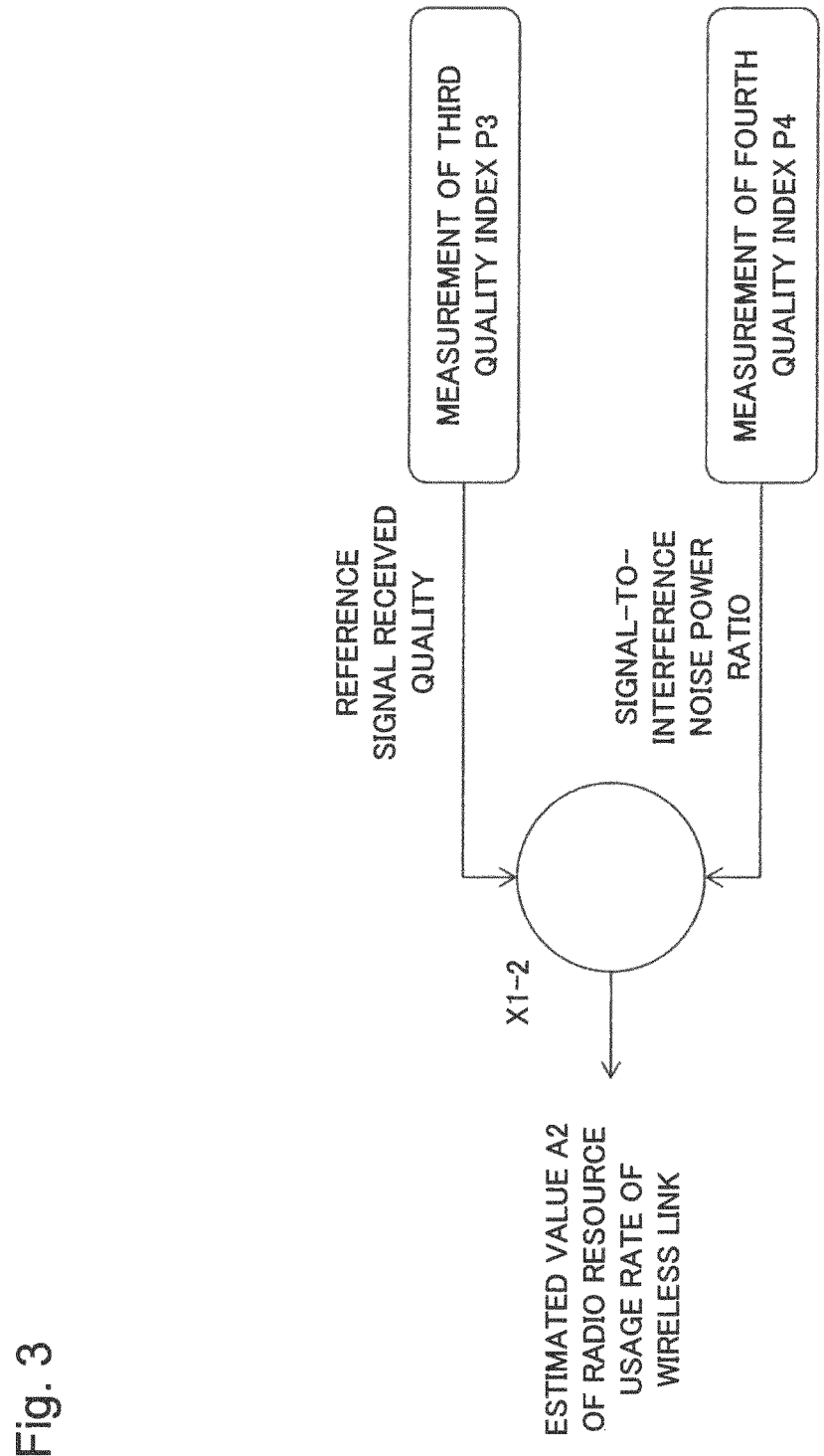
FIG. 3 is a schematic diagram of a method of calculating an estimated value A2 of a radio resource usage rate of the wireless link in FIG. 1.

FIG. 3 is a schematic diagram of a method of calculating an estimated value A2 of a radio resource usage rate of a wireless link in an exemplary embodiment. In FIG. 3, an available bandwidth estimation function X1-2 calculates the estimated value A2 of the radio resource usage rate of the wireless link by use of the third quality index P3 including the reference signal received quality, and the fourth quality index P4 including the signal-to-interference noise power ratio of the reference signal.

FIG. 4 is a schematic diagram of a method of calculating an estimated value A3 of an available bandwidth of a wireless link. In FIG. 4, an available bandwidth estimation function X1-3 calculates the estimated value A3 of the available bandwidth of the wireless link by use of the estimated value A1 of the bandwidth of the wireless link, the estimated value A2 of the radio resource usage rate of the wireless link, and the fourth quality index P4 including the signal-to-interference noise power ratio of the reference signal.

Hereinafter, a basic procedure of the available bandwidth estimation is described taking, as an example, a long term evolution (LTE) system a specification of which is prescribed by third generation partnership project (3GPP) and the like.

FIG. 5A is an explanatory diagram illustrating one example of a resource block configuration used for orthogonal frequency division multiple access (OFDMA). Note that FIG. 5B is an example of a resource block configuration when a number of antennas used for signal transmission is 1. FIG. 5C is an example of a resource block configuration when a number of antennas used for signal transmission is 2. In FIGS. 5A to 5C, individual squares are equivalent to resource elements. An orthogonal frequency division multiplexing (OFDM) symbol at a certain time includes not only a data signal or a control signal, but also a reference signal. Moreover, when a number of antennas is 2 or more, an unused resource element is included in some cases, as illustrated in FIG. 5C.

Figure 6:
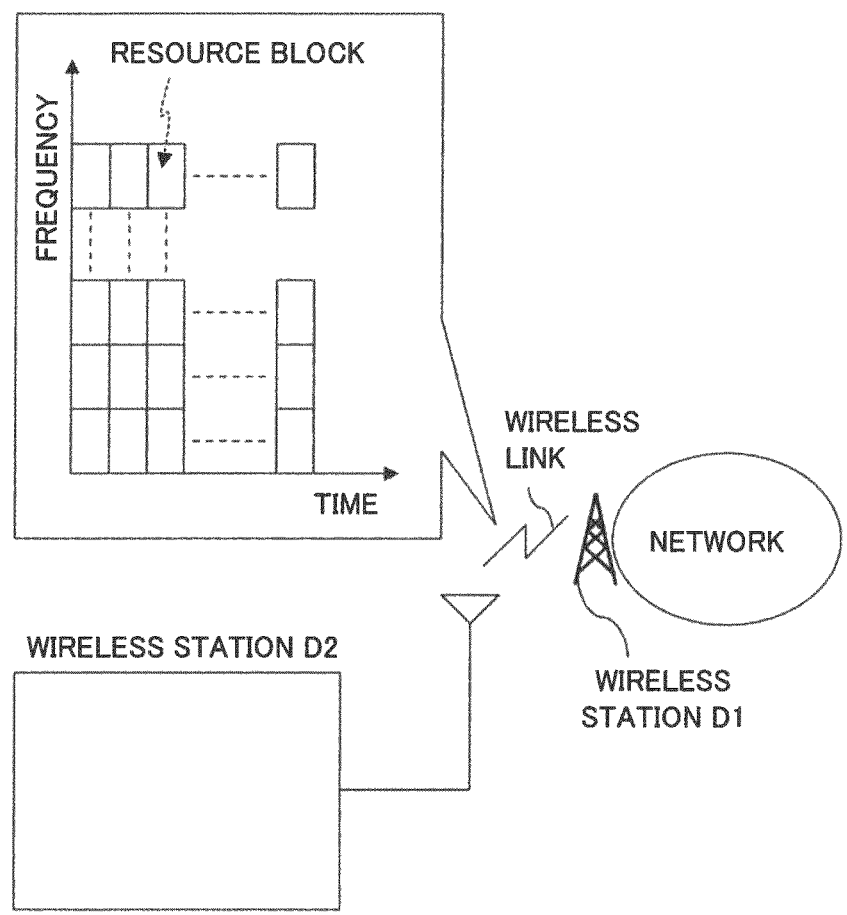
FIG. 6 is a network configuration diagram when the present example embodiment is applied to a long term evolution (LTE) system.

FIG. 6 is a network configuration diagram in the case of application to an LTE system. A wireless communication system including a wireless station D1 which manages a cell, and a wireless station D2 which receives a reference signal, a data signal, or a control signal from the wireless station D1 is illustrated in FIG. 6. Herein, it is assumed that an available bandwidth of a wireless link seen from the wireless station D2 is estimated.

The available bandwidth estimation function X1 calculates the estimated value A1 of the bandwidth of the wireless link by, for example, the following expression, using the RSSI (first quality index P1), the RSRP (second quality index P2), and the RSRQ (third quality index P3) measured at the wireless station D2.

$$A1 = \frac{RSSI \cdot RSRQ}{RSRP}$$

Herein, the estimated value A1 of the bandwidth of the wireless link is represented by a total number of allocatable resource blocks. A resource block is a minimum allocation unit of a radio resource in a wireless link (cell).

The available bandwidth estimation function X1 may calculate, from time-series data A1(t) of an estimated value of a bandwidth of a wireless link, an average value thereof in a certain period, for example, and calculate the estimated value A1 of the bandwidth of the wireless link. However, t represents a time when A1(t) are measured.

When the wireless station D2 can obtain a true value of the bandwidth of the wireless link from exchange of a control signal with the wireless station D1, the available bandwidth estimation function X1 may set the true value as A1.

Note that, when a center frequency (or E-UTRA absolute radio frequency channel number (EARFCN)) of a wireless link can be obtained (measured or detected), a bandwidth may be estimated from the center frequency (or EARFCN) by use of a fact that a relation between the center frequency (or EARFCN) and a bandwidth is fixed. In order to execute such processing, the available bandwidth estimation function X1 may hold a table indicating a relation between the center frequency (or EARFCN) and a bandwidth.

Moreover, because a center frequency and a bandwidth of a wireless link are set for each wireless station D1, the wireless station D2 may estimate or obtain a bandwidth of a wireless link at timing when the wireless station D1 which is a connection destination of the wireless station D2 changes. For example, the wireless station D2 estimates or obtains a bandwidth of a wireless link at timing when handover is detected. At timing other than the timing described above, the wireless station D2 utilizes a bandwidth of a wireless link estimated or obtained in the past.

The available bandwidth estimation function X1 calculates the estimated value A2 of the radio resource usage rate of the wireless link by, for example, the following expression, using the third quality index P3 including the reference signal received quality measured at the wireless station D1, and the fourth quality index P4 including the signal-to-interference noise power ratio of the reference signal. Note that it is assumed that a number of antennas used by the wireless station D1 for signal transmission is $N_{TX}$, and an adjustment term such as transmission power or a resource block structure when the wireless station D1 transmits a signal is $\alpha$. $\sigma$ represents an adjustment term such as noise power. $\alpha$ and $\sigma$ may be fixed values or variable values.

$$A2 = \frac{1}{5} \cdot \left( \frac{1}{2 \cdot RSRQ} - \frac{6}{SINR} - 1 \right)$$

or $$A2 = \frac{1}{5 \cdot \alpha} \cdot \left( \frac{1}{2 \cdot RSRQ} - \frac{6}{SINR} - 1 \right)$$

or $$A2 = \frac{1}{4 \cdot N_{TX}} \cdot \left( \frac{1}{2 \cdot RSRQ} - \frac{6}{SINR} - 2 \right)$$

or $$A2 = \frac{1}{4 \cdot N_{TX} \cdot \alpha} \cdot \left( \frac{1}{2 \cdot RSRQ} - \frac{6}{SINR} - 2 \right)$$

or $$A2 = (1.2 - \sigma) - \frac{12}{5} \cdot RSRQ$$

or $$A2 = \frac{1}{\alpha} \left\{ (1.2 - \sigma) - \frac{12}{5} \cdot RSRQ \right\}$$

Herein, the estimated value A2 of the radio resource usage rate of the wireless link is represented by a resource block usage rate. A resource block is a minimum allocation unit of a radio resource in a wireless link. A resource block usage rate is a value obtained by dividing a resource block usage number of a wireless link by a total number of allocatable resource blocks.

The available bandwidth estimation function X1 may calculate, from time-series data A2(t) of an estimated value of a radio resource usage rate, an average value thereof in a certain period, for example, and calculate the estimated value A2 of the radio resource usage rate. However, t represents a time when A2(t) are measured.

The available bandwidth estimation function X1 calculates the estimated value A3 of the available bandwidth of the wireless link by, for example, the following procedure, using the estimated value A1 of the bandwidth of the wireless link, the estimated value A2 of the radio resource usage rate of the wireless link, and the fourth quality index P4 including the signal-to-interference noise power ratio of the reference signal.

$$A3 = A1 \cdot (1-A2) \cdot F(P4)$$

Herein, F(P4) is a function of the fourth quality index P4 including the signal-to-interference noise power ratio of the reference signal, and represents an expectation value of throughput [bit/s] per resource block.

The available bandwidth estimation function X1 may set, as a final available bandwidth value, a value obtained by performing predetermined computation processing on the estimated value A3 of the available bandwidth calculated as described above. The available bandwidth estimation function X1 may calculate, for example, a final estimated value of an available bandwidth as β×A3. Herein, β is a parameter changing in value depending on a bandwidth of a wireless link, a transmission mode of a wireless signal, a scheduling characteristic of a radio resource in the wireless station D1, and the like. β may be a fixed value or a variable value.

A function F (SINR) is more specifically described with P4 as an SINR.

First, for example, the available bandwidth estimation function X1 calculates a channel quality indicator (CQI) which is quality information of a downlink from an SINR [dB] of the downlink, using a reference table as illustrated in FIG. 7. Alternatively, quality information of a downlink may be represented by the SINR itself. Then, a payload size [bit] per resource block is calculated from the CQI and a total number of resource blocks, by use of a reference table as illustrated in FIG. 8. For this payload size, an expectation value of throughput [bit/s] per resource block needs only to be calculated on the basis of an averaging section defined by time, for example, transmission time interval (TTI) which is a minimum time interval of scheduling and the like.

Alternatively, as illustrated in FIG. 9, throughput [Mbit/s] per resource block may be directly calculated from a CQI, using data in which a CQI is associated with throughput [Mbit/s] per resource block.

Alternatively, as illustrated in FIG. 10, throughput [Mbit/s] per resource block may be directly calculated from an SINR, using data in which a range of an SINR is associated with throughput [Mbit/s] per resource block.

Note that the available bandwidth estimation function X1 may calculate the estimated value A3 of the available bandwidth of the wireless link by, for example, the following expression, using the estimated value A1 of the bandwidth of the wireless link, the estimated value A2 of the radio resource usage rate of the wireless link, and the fourth quality index P4 including the signal-to-interference noise power ratio of the reference signal.

$$A3 = (1-A2) \cdot G(P4, A1)$$

or $$A3 = G(P4, A1 \cdot (1-A2))$$

Herein, a function G(x, y) represents throughput at which the fourth quality index (SINR) is expected when a bandwidth (total number of resource blocks) is y. For example, with LTE, a modulation and coding scheme (MCS) used for transmission of a wireless signal is determined depending on the SINR. Further, a transport block size is determined by the determined MCS, and a number of resource blocks available at this time. On the basis of this transport block size, throughput of a wireless section can be calculated. The above-described function G may be a transport block size which is obtained under a predetermined MCS and a number of resource blocks, and which is previously held in a form such as a table.

The available bandwidth estimation function X1 may set, as a final estimated available bandwidth, a value obtained by performing predetermined computation processing on the estimated value A3 of the available bandwidth calculated as described above. For example, the available bandwidth estimation function X1 may calculate a final estimated value of an available bandwidth as β×A3. Herein, β is a parameter changing in value depending on a bandwidth of a wireless link, a transmission mode of a wireless signal, a scheduling characteristic of a radio resource in the wireless station D1, and the like. β may be a fixed value or a variable value.

For example, when a number of spatial multiplexing (a number of layers, a number of streams, or a number of ranks) by multiple-input multiple-output (MIMO) can be obtained (measured or detected) as a transmission mode, β may be set depending on a number of spatial multiplexing. For example, β=1 when a number of spatial multiplexing is 1, and β=2 when a number of spatial multiplexing is 2. Moreover, in general, when an SINR is better, there is a higher possibility that a higher number of spatial multiplexing can be used, and therefore, an SINR may be converted into β (a real number of 1 or more and N or less) by a function having a positive correlation with the SINR. Herein, N is a maximum number of spatial multiplexing. Note that MIMO is a scheme (multi-antenna transmission) which divides transmission data into a plurality of signals (streams) in advance, and simultaneously transfers the signals from a plurality of antennas (multi-antenna) on the same frequency band.

As another example of setting β, the following method may be used. For example, throughput (TP) between the wireless station D1 and the wireless station D2 is measured at timing when a communication by the wireless station D2 occurs. Moreover, the estimated value A3 of the available bandwidth is also calculated by the method described above. Then, a value of β is calculated by β=TP/A3. Once β is calculated, only the estimated value A3 of the available bandwidth is calculated without measuring throughput (TP) between the wireless station D1 and the wireless station D2, and thereby, an available bandwidth can be estimated by β×A3.

Note that estimated values are used for a radio resource usage rate and a bandwidth in the case described above, but when a radio resource usage rate and a bandwidth can be obtained (measured or detected) without performing estimation, the obtained values (measured or detected values) may be used instead of estimated values.

Furthermore, the wireless station D1 or the wireless station D2 may include a communication control function of controlling communication depending on an available bandwidth of a wireless link. For example, the wireless station D1 or the wireless station D2 performs predetermined communication processing when an available bandwidth of a wireless link satisfies a predetermined condition.

For example, when an available bandwidth of a wireless link is equal to or more than a predetermined value or more than a predetermined value, the wireless station D2 downloads a predetermined file from a server. Thus, the wireless station D2 may include a function of previously scheduling and holding processing executed when there is an enough available bandwidth of a wireless link.

As another example, the wireless station D1 may instruct to switch a connection destination of the wireless station D2 to another wireless station having a larger available bandwidth of a wireless link or another frequency when an available bandwidth of a wireless link regarding the wireless station D2 requesting a communication start is less than a predetermined value or equal to or less than a predetermined value. A predetermined value of an available bandwidth may be an absolute value (e.g., 1 Mbps), or determined depending on an application or a quality class indicator (QCI). For example, a predetermined value of an available bandwidth may be set to a 5 Mbps when an application is a moving image, or 1 Mbps when an application is a Web.

As described above, communication control performed by the communication control function may be control performed by use of the same wireless link, or may be control of switching a wireless link itself.

As described above, according to the present example embodiment, an available bandwidth of a wireless link is estimated by the available bandwidth estimation function X1 by use of the first quality index P1 including the total received power measured at the wireless station D2, the second quality index P2 including the reference signal received power, the third quality index P3 including the reference signal received quality, and the fourth quality index P4 including the signal-to-interference noise power ratio of the reference signal. This makes it possible to precisely calculate an available bandwidth of a wireless link without imposing a communication load.

In the above description, details of the conceptual configuration and operation according to the exemplary embodiment have been presented. Hereinafter, a specific configuration example according to an example embodiment is presented.

First Exemplary Embodiment

Figure 11:
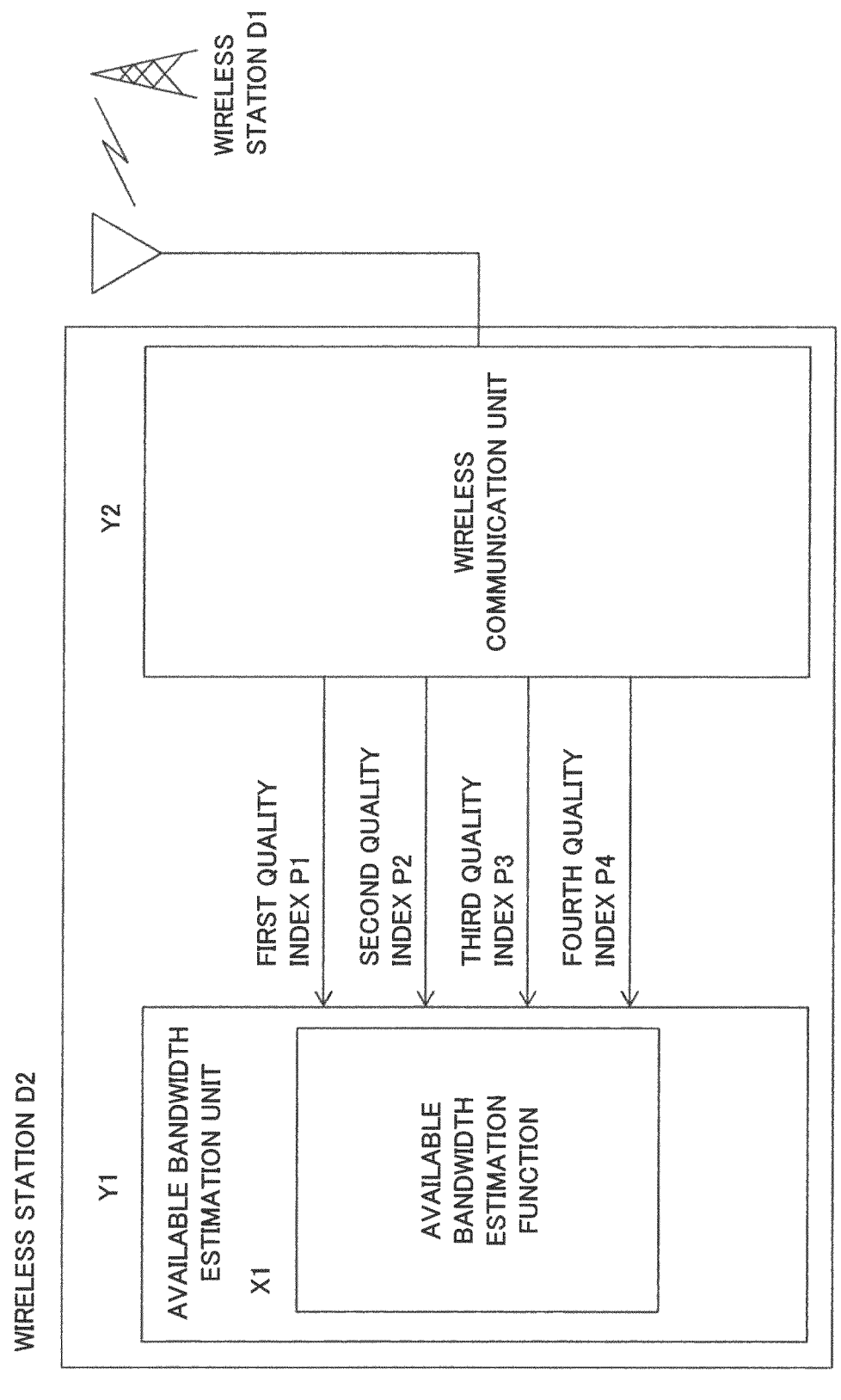
FIG. 11 is a configuration diagram illustrating a band estimation system according to a first exemplary embodiment.

As illustrated in FIG. 11, a band estimation system according to a first exemplary embodiment is configured to include a wireless station D1 and a wireless station D2, as well as an available bandwidth estimation unit Y1, a wireless communication unit Y2, and an available bandwidth estimation function X1 in the wireless station D2.

According to the present example embodiment, an available bandwidth of a wireless link is calculated (estimated) by the available bandwidth estimation function X1 of the available bandwidth estimation unit Y1, using a first quality index P1 including total received power measured by the wireless communication unit Y2 of the wireless station D2, a second quality index P2 including reference signal received power, a third quality index P3 including reference signal received quality, and a fourth quality index P4 including a signal-to-interference noise power ratio of the reference signal.

Figure 12A:
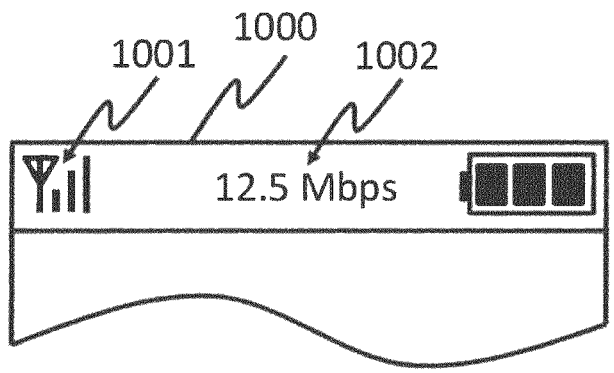
FIG. 12A is a configuration diagram illustrating one example of a method of displaying an estimated available bandwidth of a wireless link.
Figure 12B:
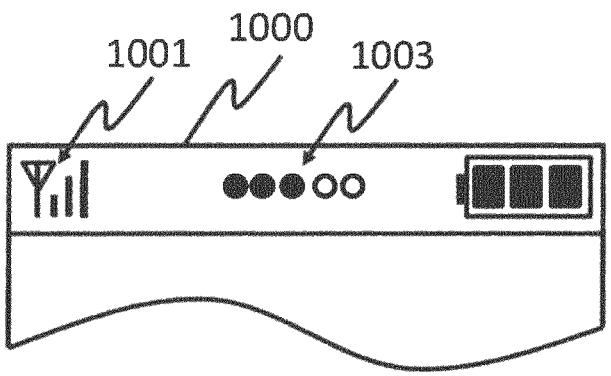
FIG. 12B is a configuration diagram illustrating another example of a method of displaying an estimated available bandwidth of a wireless link.
Figure 12C:
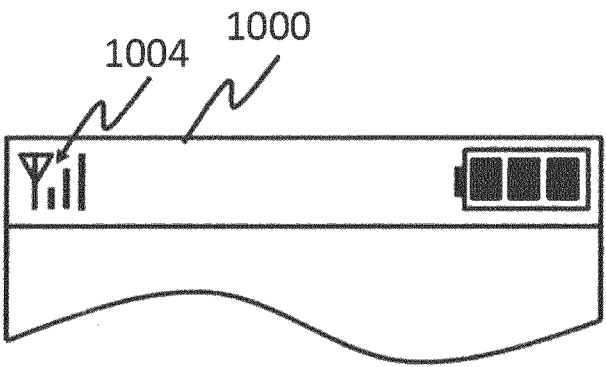
FIG. 12C is a configuration diagram illustrating yet another example of a method of displaying an estimated available bandwidth of a wireless link.

Note that the wireless station D2 may display an available bandwidth of a wireless link by use of a display means (e.g., a display unit or a display) of the wireless station D2. A display example of an available bandwidth of a wireless link is illustrated in FIG. 12A, FIG. 12B, and FIG. 12C. In FIG. 12A, in a notification region 1000 in a display upper part, radio quality (e.g., reference signal received power and reference signal received quality) is displayed by a number of antennas 1001, and an available bandwidth of a wireless link is displayed by numerical information 1002. In FIG. 12B, in a notification region 1000 in a display upper part, radio quality (e.g., reference signal received power and reference signal received quality) is displayed by a number of antennas 1001, and an available bandwidth of a wireless link is displayed by an indicator 1003. In FIG. 12C, an available bandwidth of a wireless link is displayed by use of a number of antennas 1004.

According to the present example embodiment, it is possible to precisely calculate (estimate) an available bandwidth of a wireless link without imposing a communication load.

Second Exemplary Embodiment

Figure 13:
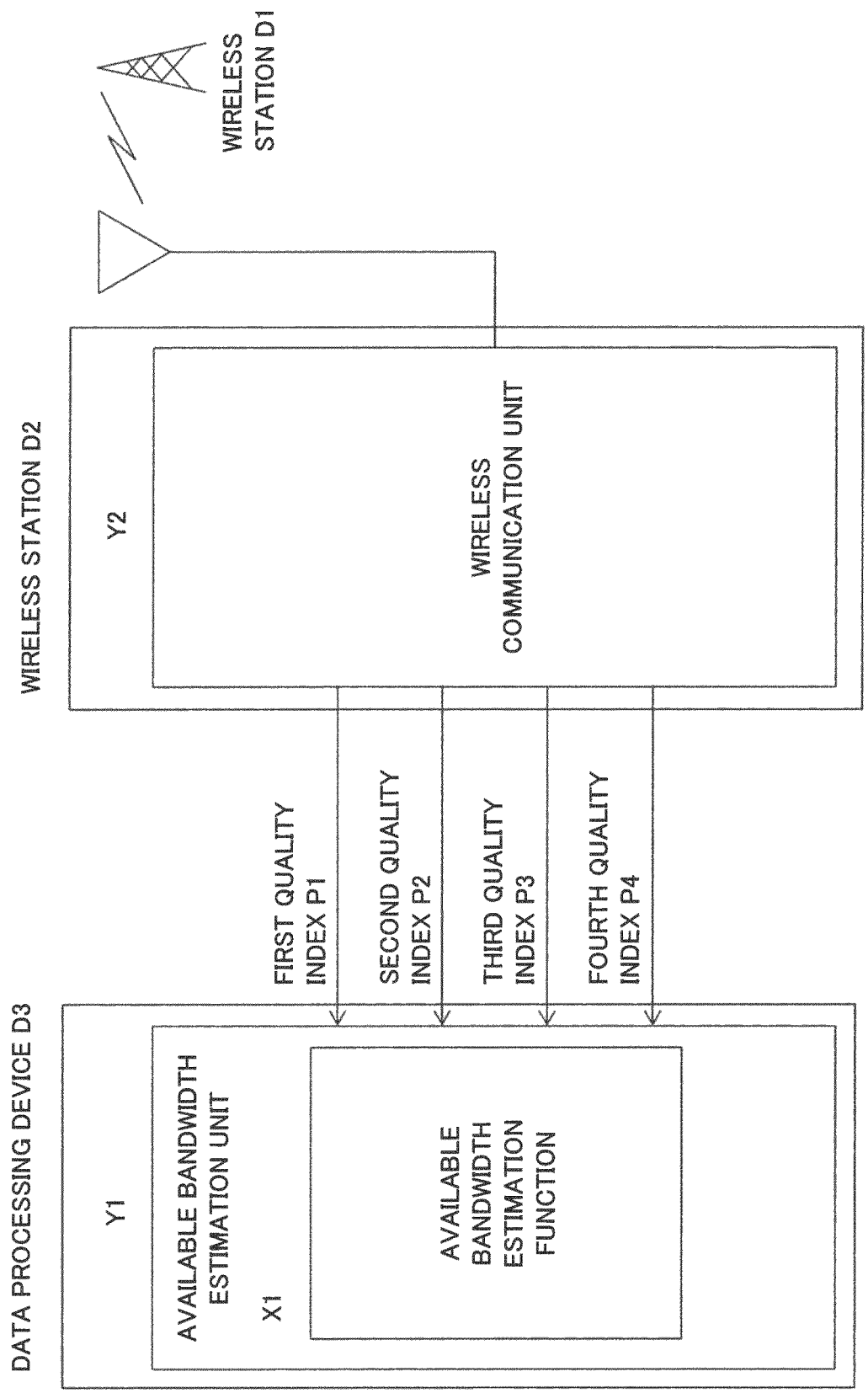
FIG. 13 is a configuration diagram illustrating a band estimation system according to a second exemplary embodiment.

As illustrated in FIG. 13, a band estimation system according to a second exemplary embodiment is configured to include a wireless station D1, a wireless station D2, and a data processing device D3. The wireless station D2 includes a wireless communication unit Y2. The data processing device D3 includes an available bandwidth estimation unit Y1 and an available bandwidth estimation function X1.

According to the present example embodiment, an available bandwidth of a wireless link is estimated by the available bandwidth estimation function X1 of the available bandwidth estimation unit Y1, using a first quality index P1 including total received power measured by the wireless communication unit Y2 of the wireless station D2, a second quality index P2 including reference signal received power, a third quality index P3 including reference signal received quality, and a fourth quality index P4 including a signal-to-interference noise power ratio of the reference signal.

According to the present example embodiment, it is possible to precisely calculate (estimate) an available bandwidth of a wireless link without imposing a communication load.

Third Exemplary Embodiment

According to the present example embodiment, statistical processing is performed on time-series data of a measured estimated value A3 of an available bandwidth of a wireless link, in order to suppress variation of an estimation result of an available bandwidth of a wireless link. Specifically, time-series data of the estimated value A3 of the available bandwidth of the wireless link are collected over a certain period (e.g., 1 second, 10 seconds, 1 minute, 1 hour or the like), and subjected to statistical processing. Average or weighting processing, or the like can be used as statistical processing.

According to the present example embodiment, it is possible to observe an available bandwidth fluctuation of a wireless link in a desired particle size.

Fourth Exemplary Embodiment

According to the present example embodiment, time-series data of an estimated value A3 of an available bandwidth of a wireless link held by a plurality of wireless stations D2 are collected by a server on a network, and subjected to statistical processing together with a place of measurement, and position information of a wireless station D1 or a wireless station D2. Thereby, an available bandwidth of a wireless link is displayed on a map. For example, a communication area may be separated by colors depending on an available bandwidth of a wireless link, or color separation of a communication area may also be changed depending on a fluctuation of an available bandwidth of a wireless link, and thus displayed like animation. Time-series data may be collected by the server in a free time zone in which a wireless link is free.

According to the present example embodiment, it is possible to observe quality of a communication area by visualizing an available bandwidth fluctuation in a wireless link on a map. Further, by investigating communication quality in a communication area, and adjusting various parameters, it is possible to use as a means of improving the communication quality.

Fifth Exemplary Embodiment

According to the present example embodiment, a server on a network collects time-series data of an estimated value A3 of an available bandwidth of a wireless link held by a plurality of wireless stations D2, and performs statistical processing on the time-series data of the estimated value A3 of the available bandwidth of each wireless link collected from the plurality of wireless stations D2. Average or weighting processing, or the like can be used as statistical processing.

According to the present example embodiment, it is possible to more precisely estimate an available bandwidth of a wireless link by increasing a number of samples of the estimated value A3 of the available bandwidth of the wireless link.

Sixth Exemplary Embodiment

Figure 14:
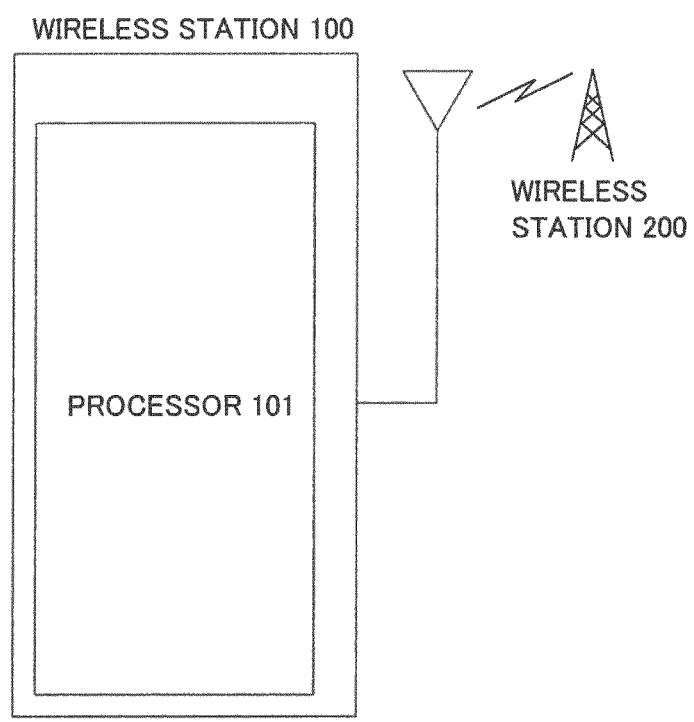
FIG. 14 is a conceptual diagram regarding a sixth exemplary embodiment.

FIG. 14 is a conceptual diagram illustrating a sixth exemplary embodiment. In FIG. 14, a wireless station 100 includes a processor 101. The processor 101 is configured to calculate an available bandwidth in a wireless link from a bandwidth for a wireless link between the wireless station 100 and another wireless station 200, a radio resource usage rate which is a ratio of a number of frequency blocks used for signal transfer, to a plurality of frequency blocks constituting the bandwidth, and radio quality of the wireless link.

According to the present example embodiment, a wireless station can precisely calculate (estimate) an available bandwidth of a wireless link without imposing a communication load.

Seventh Exemplary Embodiment

Figure 15:
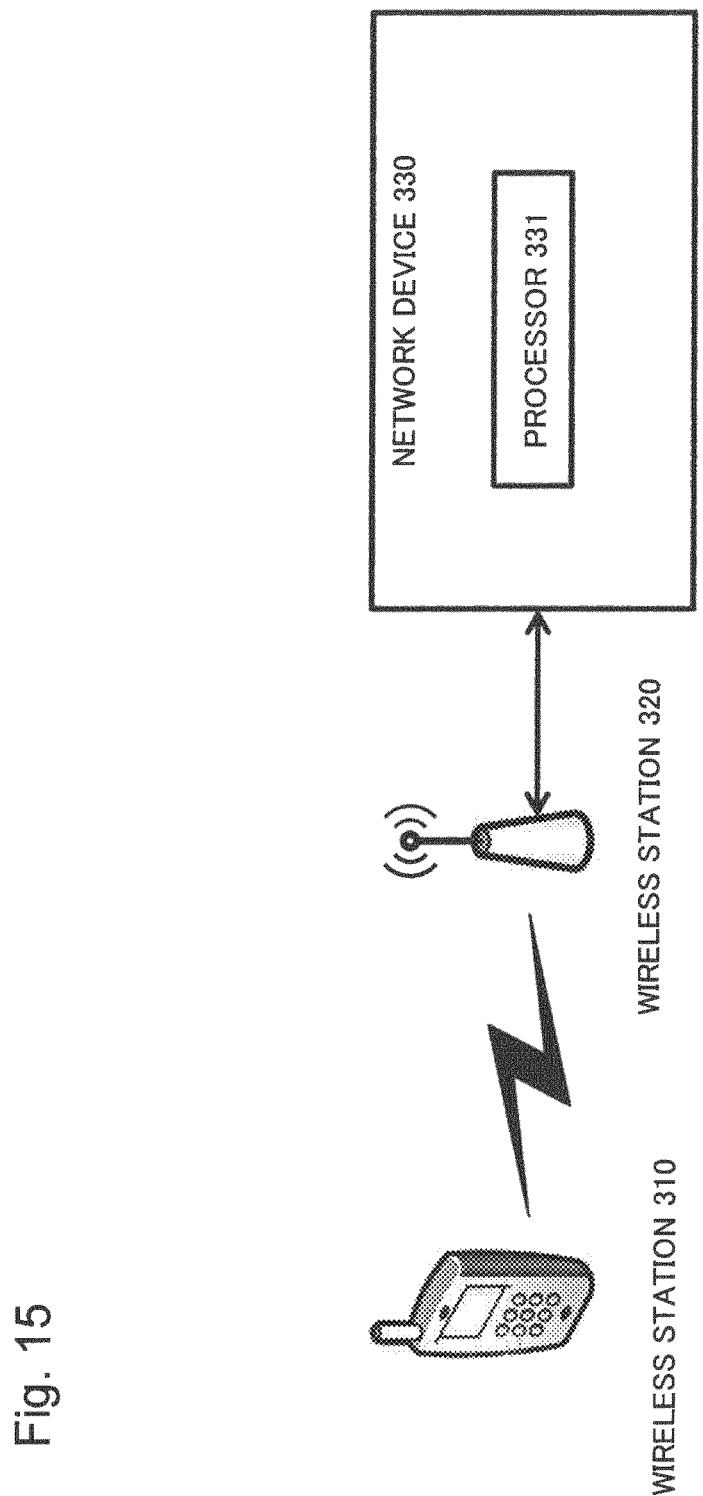
FIG. 15 is a conceptual diagram regarding a seventh exemplary embodiment.

FIG. 15 is a conceptual diagram illustrating a seventh exemplary embodiment. In FIG. 15, a network device 330 is configured to be able to communicate with a second wireless station 320 connected to a first wireless station 310 via a wireless link. Moreover, the network device 330 includes a processor 331. The processor 331 is configured to calculate an available bandwidth in the wireless link described above from a bandwidth for a wireless link, a radio resource usage rate which is a ratio of a number of frequency blocks used for signal transfer, to a plurality of frequency blocks constituting the bandwidth, and radio quality of the wireless link.

According to the present example embodiment, the network device can precisely calculate (estimate) an available bandwidth of a wireless link without imposing a communication load.

EXAMPLE

Figure 16:
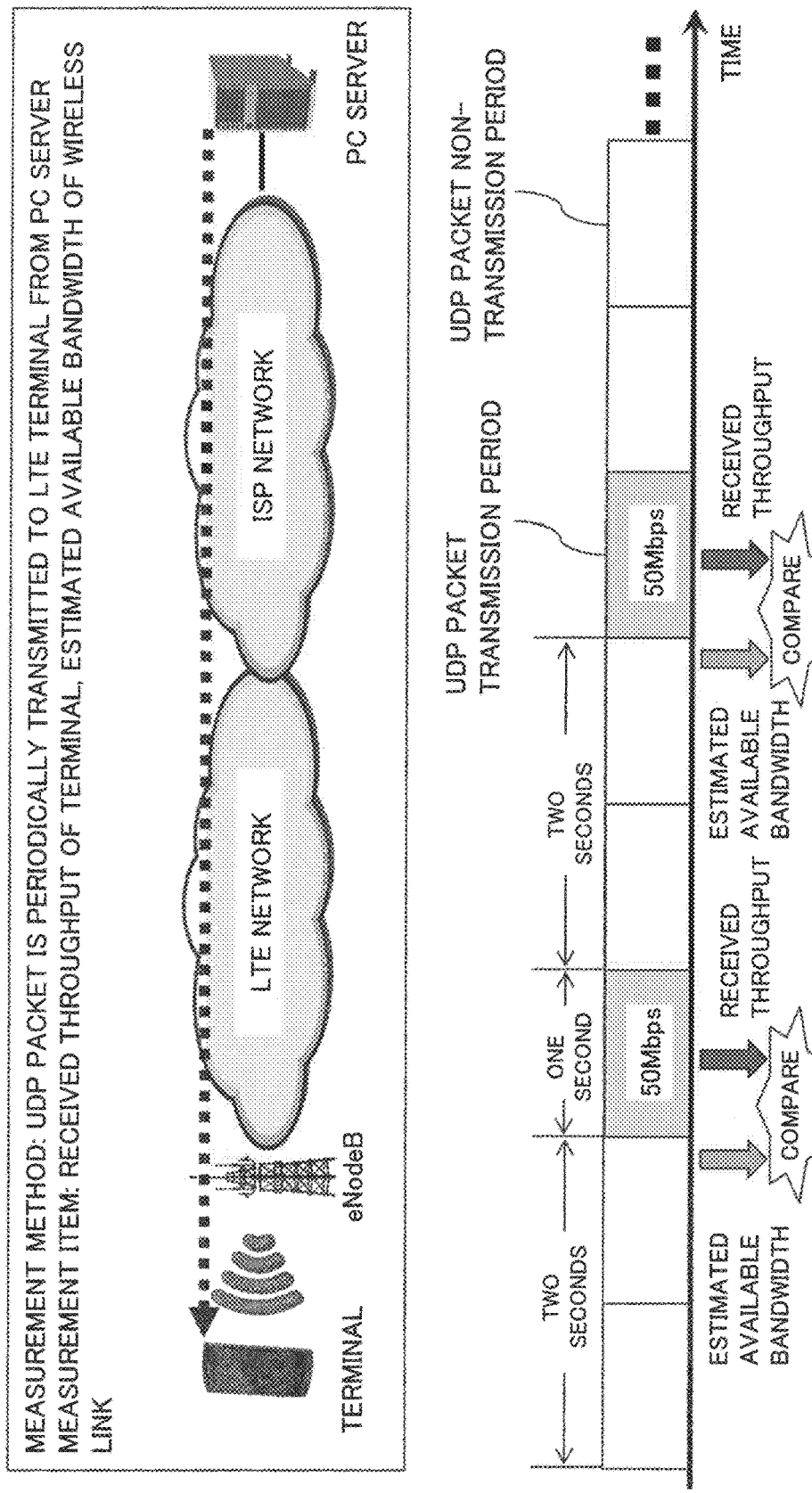
FIG. 16 is a diagram illustrating an overview of an experiment of estimating an available bandwidth of a wireless link.

As illustrated in FIG. 16, an experiment was conducted on an actual LTE network, in which actual terminal received throughput was compared with an estimated value of an available bandwidth calculated by the bandwidth estimation method described above. As a result of this experiment, as illustrated in FIG. 17, a strong correlation was seen between the actual terminal received throughput and the estimated value of the available bandwidth calculated by the bandwidth estimation method described above (a correlation coefficient of 0.719).

Other Exemplary Embodiments

In the above description, an "available bandwidth" is also referred to as an available bandwidth, a surplus bandwidth, or a usable bandwidth. An "available bandwidth" can also be represented as an available bandwidth, an unoccupied bandwidth, a residual bandwidth, an excess bandwidth, a free bandwidth, or an unused bandwidth.

In the above description, the available bandwidth estimation function X1 calculates the estimated value A2 of the radio resource usage rate of the wireless link by use of the third quality index P3 and the fourth quality index P4, but a method of calculating the estimated value A2 is not limited thereto. The available bandwidth estimation function X1 can calculate the estimated value A2 of the radio resource usage rate of the wireless link by use of at least one of the first quality index P1, the third quality index P3, and the fourth quality index P4. Specifically, the estimated value A2 can be calculated on the basis of one of the first quality index P1, the third quality index P3, and the fourth quality index P4. Alternatively, the estimated value A2 can be calculated on the basis of the first quality index P1 and the third quality index P3. Alternatively, the estimated value A2 can be calculated on the basis of the third quality index P3 and the fourth quality index P4. Alternatively, the estimated value A2 can be calculated on the basis of the first quality index P1 and the fourth quality index P4. Alternatively, the estimated value A2 can be calculated on the basis of the first quality index P1, the third quality index P3, and the fourth quality index P4. Alternatively, the estimated value A2 can be calculated on the basis of the first quality index P1, the second quality index P2, and the fourth quality index P4.

The first quality index P1, the second quality index P2, the third quality index P3, and the fourth quality index P4 can be measured at a wireless station. Measured measurement information (the first quality index P1, the second quality index P2, the third quality index P3, and the fourth quality index P4) can be transmitted to a network device from the wireless station. Measured measurement information (the first quality index P1, the second quality index P2, the third quality index P3, and the fourth quality index P4) measured during a certain period is put together as time-series data, and then the time-series data may be transmitted to a network device from the wireless station. The network device may perform the above-described operation of calculating an estimated value of an available bandwidth by use of the measurement information received from the wireless station.

The network device described above may be a network upper device, a core network node, an upper device, a node, a management device, a management node, a server, or the like.

Although a target for calculating an available bandwidth is a wireless link in a down direction in the example embodiment described above, an available bandwidth of a wireless link in an up direction (uplink) may be calculated.

Moreover, although an LTE scheme wireless communication system is presented as an example in the example embodiment described above, at least some of methods and devices in various example embodiments are applicable to a wide range of communication systems including many non-LTE and/or non-cellular systems. For example, the example embodiment described above may be a universal mobile telecommunications system (UMTS) scheme. Alternatively, the example embodiment described above may be a wireless communication system which adopts a frequency division duplex (FDD) scheme that simultaneously uses different frequencies in an up line and a down line. Alternatively, the example embodiment described above may be a different wireless communication system which adopts a time division duplex (TDD) scheme that uses the same frequency in an up line and a down line by time. Alternatively, the example embodiment described above may be a wireless communication system which adopts a carrier aggregation (CA) scheme that accelerates communication by simultaneously utilizing radiowaves on a plurality of frequency bandwidths, and transmitting and receiving data in a distributed manner as one communication line. In the case of CA, an available bandwidth of a wireless link is calculated for each of a primary cell (PCELL) and a secondary cell (SCELL).

Alternatively, a computer program (hereinafter, referred to as a program) in which processing contents are described as a procedure may be recorded in a readable recording medium in each element (terminal, base station, or network device) constituting a communication system (wireless communication system), and the program recorded in the recording medium may be read into each component of the communication system and executed.

Alternatively, a computer program (hereinafter, referred to as a program) in which processing contents are described as a procedure may be recorded in a readable recording medium in each element constituting a communication system, and the program recorded in the recording medium may be read into each component of the communication system and executed.

The program recorded in the recording medium is read in a central processing unit (CPU) provided in each component of the communication system, and processing similar to that described above is performed under the control of the CPU. Herein, the CPU operates as a computer that executes the program read from the recording medium in which the program is recorded.

In the example described above, the program can be stored by use of various types of non-transitory computer readable media, and supplied to a computer. The non-transitory computer readable media include various types of tangible storage media. Examples of non-transitory computer readable media include a magnetic recording medium (e.g., a flexible disc, a magnetic tape, and a hard disc drive), a magneto-optical recording medium (e.g., a magneto-optical disc), a compact disc (CD)-read only memory (ROM), a CD-R, a CD-R/W, a digital versatile disc (DVD), and a semiconductor memory (e.g., a mask ROM, a programmable ROM (PROM), an erasable PROM (EPROM), a flash ROM, and a random access memory (RAM)). Moreover, a program may be supplied to a computer by various types of transitory computer readable media. Examples of transitory computer readable media include an electric signal, an optical signal, and an electromagnetic wave. A transitory computer readable medium can supply a program to a computer via a wired communication path such as an electric wire and an optical fiber, or a wireless communication path.

Furthermore, the present invention is not limited solely to the example embodiments described above, and it goes without saying that various modifications can be made without departing from the spirit of the present invention already described. The functions or steps and/or operations according to each example embodiment described in the present description do not need to be executed in a particular order. Additionally, an element according to the present invention is described or claimed in a singular form in some cases, but may be in a plural form unless otherwise explicitly described as being limited to a singular form.

While the invention of the present application has been described with reference to the example embodiments, the invention of the present application is not limited to the example embodiments described above. Various changes that can be appreciated by a person skilled in the art can be made to a configuration and details of the invention of the present application within the scope of the invention of the present application.

<Supplementary Note>

Some or all of the example embodiments and examples described above can also be described as in Supplementary notes below, but are not limited to the followings.

(Supplementary note 1)

A communication system configured to
calculate an available bandwidth in a wireless link from
a bandwidth of the wireless link,
a radio resource usage rate of the wireless link, and
radio quality of the wireless link.

(Supplementary Note 32)

The communication system according to Supplementary note 1, wherein
at least any one of the bandwidth or the radio resource usage rate is estimated
by use of at least any one of
a first quality index including received signal strength total received power,
a second quality index including received power of a reference signal,
a third quality index including received quality of the reference signal, and
a fourth quality index including a signal-to-interference noise power ratio of the reference signal,
the first to fourth quality indices being measured regarding the wireless link.

(Supplementary note 3)

The communication system according to Supplementary note 2, wherein
the radio resource usage rate is estimated by use of at least one of the third quality index and the fourth quality index.

(Supplementary note 4)

The communication system according to Supplementary note 2 or 3, wherein
the bandwidth is estimated
from the first quality index, the second quality index, and the third quality index.

(Supplementary note 5)

The communication system according to any one of Supplementary notes 1 to 4, wherein
an estimated value of the available bandwidth is calculated further in consideration of a transmission mode of the wireless link.

(Supplementary note 6)

The communication system according to any one of Supplementary notes 1 to 5, wherein
the radio quality of the wireless link is a signal-to-interference noise power ratio of a reference signal.

(Supplementary note 7)

The communication system according to any one of Supplementary notes 1 to 6, wherein the bandwidth is represented by a total number of frequency blocks.

(Supplementary note 8)

The communication system according to any one of Supplementary notes 1 to 7, wherein the radio resource usage rate is a ratio of a number of frequency blocks used for signal transfer, to a total number of frequency blocks.

(Supplementary note 9)

The communication system according to any one of Supplementary notes 1 to 8, wherein the available bandwidth represents an amount of data transmittable per unit time in a wireless link in a down direction.

(Supplementary note 10)

The communication system according to any one of Supplementary notes 5 to 9, wherein a transmission mode of the wireless link is a transmission mode of multi-antenna transmission.

(Supplementary note 11)

The communication system according to any one of Supplementary notes 1 to 10, further comprising:

a communication control function which executes communication control when an estimated value of the available bandwidth satisfies a predetermined condition.

(Supplementary note 12)

The communication system according to any one of Supplementary notes 2 to 11, further comprising:

a display unit which displays at least one of the calculated available bandwidth, and radio quality of received reference signal.

(Supplementary note 13)

A control method comprising:

calculating an available bandwidth in a wireless link from a bandwidth for the wireless link between a first wireless station and a second wireless station, a radio resource usage rate which is a ratio of a number of frequency blocks used for signal transfer, to a plurality of frequency blocks constituting the bandwidth, and radio quality of the wireless link.

(Supplementary note 14)

The control method according to Supplementary note 13, wherein at least one of the bandwidth and the radio resource usage rate is estimated by use of at least one of a first quality index including total received power measured at the first wireless station, a second quality index including received power of a reference signal transmitted to the first wireless station from the second wireless station, a third quality index including received quality of the reference signal, and a fourth quality index including a signal-to-interference noise power ratio of the reference signal.

(Supplementary note 15)

The control method according to Supplementary note 14, wherein the radio resource usage rate is estimated by use of at least one of the first quality index, the third quality index, and the fourth quality index.

(Supplementary note 16)

The control method according to Supplementary note 14 or 15, wherein the bandwidth is estimated, based on the first quality index, the second quality index, and the third quality index.

(Supplementary note 17)

The control method according to any one of Supplementary notes 13 to 16, wherein the available bandwidth is calculated further in consideration of a transmission mode of multi-antenna transmission of the wireless link.

(Supplementary note 18)

The control method according to any one of Supplementary notes 13 to 17, wherein the radio quality of the wireless link is a signal-to-interference noise power ratio of a reference signal transmitted to the first wireless station from the second wireless station.

(Supplementary note 19)

The control method according to any one of Supplementary notes 13 to 18, wherein when the available bandwidth satisfies a predetermined condition, a wireless communication of the first wireless station is controlled.

(Supplementary note 20)

The control method according to any one of Supplementary notes 14 to 19, wherein at least one of the calculated available bandwidth, and radio quality of a reference signal transmitted to the first wireless station from the second wireless station is displayed.

(Supplementary note 21)

A program which causes a computer to:

calculate an available bandwidth in a wireless link from a bandwidth for the wireless link between a first wireless station and a second wireless station, a radio resource usage rate which is a ratio of a number of frequency blocks used for signal transfer, to a plurality of frequency blocks constituting the bandwidth, and radio quality of the wireless link.

(Supplementary note 22)

The program according to Supplementary note 21, wherein at least one of the bandwidth and the radio resource usage rate is estimated by use of at least one of a first quality index including total received power measured at the first wireless station, a second quality index including received power of a reference signal transmitted to the first wireless station from the second wireless station, a third quality index including received quality of the reference signal, and a fourth quality index including a signal-to-interference noise power ratio of the reference signal.

(Supplementary note 23)

The program according to Supplementary note 22, wherein the radio resource usage rate is estimated by use of at least one of the first quality index, the third quality index, and the fourth quality index.

(Supplementary note 24)

The program according to Supplementary note 22 or 23, wherein the bandwidth is estimated, based on the first quality index, the second quality index, and the third quality index.

(Supplementary note 25)

The program according to any one of Supplementary notes 21 to 24, wherein the available bandwidth is calculated further in consideration of a transmission mode of multi-antenna transmission of the wireless link.

(Supplementary note 26)

The program according to any one of Supplementary notes 21 to 25, wherein the radio quality of the wireless link is a signal-to-interference noise power ratio of a reference signal transmitted to the first wireless station from the second wireless station.

(Supplementary note 27)

The program according to any one of Supplementary notes 21 to 26, wherein when the available bandwidth satisfies a predetermined condition, a wireless communication of the first wireless station is controlled.

(Supplementary note 28)

The program according to any one of Supplementary notes 22 to 27, wherein at least one of the calculated available bandwidth, and radio quality of a reference signal transmitted to the first wireless station from the second wireless station is displayed.

(Supplementary note 29)

A network device configured to be able to communicate with a second wireless station connected to a first wireless station via a wireless link, the network device comprising:

a processor configured to calculate an available bandwidth in the wireless link from a bandwidth for the wireless link, a radio resource usage rate which is a ratio of a number of frequency blocks used for signal transfer, to a plurality of frequency blocks constituting the bandwidth, and radio quality of the wireless link.

(Supplementary note 30)

The network device according to Supplementary note 29, wherein the processor estimates at least one of the bandwidth and the radio resource usage rate by use of at least one of a first quality index including total received power measured at the first wireless station, a second quality index including received power of a reference signal transmitted to the first wireless station from the second wireless station, a third quality index including received quality of the reference signal, and a fourth quality index including a signal-to-interference noise power ratio of the reference signal.

(Supplementary note 31)

The network device according to Supplementary note 30, wherein the radio resource usage rate is estimated by use of at least one of the first quality index, the third quality index, and the fourth quality index.

(Supplementary note 32)

The network device according to Supplementary note 30 or 31, wherein the bandwidth is estimated, based on the first quality index, the second quality index, and the third quality index.

(Supplementary note 33)

The network device according to any one of Supplementary notes 29 to 32, wherein the processor calculates the available bandwidth further in consideration of a transmission mode of multi-antenna transmission of the wireless link.

(Supplementary note 34)

The network device according to any one of Supplementary notes 29 to 33, wherein the radio quality of the wireless link is a signal-to-interference noise power ratio of a reference signal transmitted to the first wireless station from the second wireless station.

(Supplementary note 35)

The network device according to any one of Supplementary notes 29 to 34, wherein when the available bandwidth satisfies a predetermined condition, a wireless communication of the first wireless station is controlled.

(Supplementary note 36)

A wireless station comprising:

a processor configured to calculate an available bandwidth in a wireless link from a bandwidth for the wireless link between a wireless station and another wireless station, a radio resource usage rate which is a ratio of a number of frequency blocks used for signal transfer, to a plurality of frequency blocks constituting the bandwidth, and radio quality of the wireless link.

(Supplementary note 37)

The wireless station according to Supplementary note 36, wherein the processor estimates at least one of the bandwidth and the radio resource usage rate by use of at least one of a first quality index including total received power measured at the wireless station, a second quality index including received power of a reference signal received from the other wireless station, a third quality index including received quality of the reference signal, and a fourth quality index including a signal-to-interference noise power ratio of the reference signal.

(Supplementary note 38)

The wireless station according to Supplementary note 37, wherein the radio resource usage rate is estimated by use of at least one of the first quality index, the third quality index, and the fourth quality index.

(Supplementary note 39)

The wireless station according to Supplementary note 37 or 38, wherein the bandwidth is estimated, based on the first quality index, the second quality index, and the third quality index.

(Supplementary note 40)

The wireless station according to any one of Supplementary notes 36 to 39, wherein the processor calculates the available bandwidth further in consideration of a transmission mode of multi-antenna transmission of the wireless link.

(Supplementary note 41)

The wireless station according to any one of Supplementary notes 36 to 40, wherein the radio quality of the wireless link is a signal-to-interference noise power ratio of a reference signal received from the other wireless station.

(Supplementary note 42)

The wireless station according to any one of Supplementary notes 36 to 41, wherein when the available bandwidth satisfies a predetermined condition, a wireless communication of the wireless station is controlled.

REFERENCE SIGNS LIST

X1, X1-1, X1-2, X1-3 Available bandwidth estimation function
P1 First quality index
P2 Second quality index
P3 Third quality index
P4 Fourth quality index
A1 Estimated value of bandwidth of wireless link
A2 Estimated value of radio resource usage rate of wireless link
A3 Estimated value of available bandwidth of wireless link
D1 Wireless station
D2 Wireless station
Y1 Available bandwidth estimation unit
Y2 Wireless communication unit
D3 Data processing device
100 Wireless station
101 Processor
200 Wireless station
310 Wireless station
320 Wireless station
330 Network device
331 Processor
1000 Notification region in display upper part of wireless station
1001 Number of antennas
1002 Numerical information
1003 Indicator
1004 Number of antennas

The invention claimed is:

1. A wireless station comprising:
an antenna configured to receive a reference signal from another wireless station; and
a processor configured to calculate an available bandwidth in a wireless link between the wireless station and the other wireless station by:
obtaining a bandwidth for the wireless link between the station and the other wireless station based on a first quality index indicating total received power measured at the wireless station, a second quality index indicating received power of the reference signal received from the other wireless station, and a third quality index indicating received quality of the reference signal,
obtaining a radio resource usage rate which is a ratio of a number of frequency blocks used for signal transfer, to a plurality of frequency blocks constituting the bandwidth based on the third quality index and a fourth quality index indicating a signal-to-interference noise power ratio of the reference signal, and
obtaining radiowave quality of the wireless link based on the signal-to-interference noise power ratio of the reference signal received from the other wireless station.

2. The wireless station according to claim 1, wherein the processor estimates at least one of the available bandwidth and the radio resource usage rate by using at least one of:
the first quality index indicating the total received power measured at the wireless station,
the second quality index indicating the received power of the reference signal received from the other wireless station,
the third quality index indicating the received quality of the reference signal, and
the fourth quality index indicating the signal-to-interference noise power ratio of the reference signal.

3. The wireless station according to claim 2, wherein the processor
calculates the available bandwidth further in consideration of a transmission mode of multi-antenna transmission of the wireless link.

4. The wireless station according to claim 1, wherein the processor calculates the available bandwidth further in consideration of a transmission mode of multi-antenna transmission of the wireless link.

5. The wireless station according to claim 1, wherein when the available bandwidth satisfies a predetermined condition, a wireless communication of the wireless station is controlled.

6. The wireless station according to claim 1, wherein the available bandwidth is estimated,
based on the first quality index, the second quality index, and the third quality index.

7. The wireless station according to claim 6, wherein the processor
calculates the available bandwidth further in consideration of a transmission mode of multi-antenna transmission of the wireless link.

8. The wireless station according to claim 1, wherein the processor
calculates the available bandwidth further in consideration of a transmission mode of multi-antenna transmission of the wireless link.

9. A network device comprising:
an antenna configured to communicate with a second wireless station connected to a first wireless station via a wireless link; and
a processor configured to calculate an available bandwidth in the wireless link between the first wireless station and wireless station by:
obtaining a bandwidth for the wireless link based on a first quality index indicating total received power measured at the first wireless station, a second quality index indicating received power of a reference signal received from wireless station, and a third quality index indicating received quality of the reference signal,
obtaining a radio resource usage rate which is a ratio of a number of frequency blocks used for signal transfer, to a plurality of frequency blocks constituting the bandwidth based on the third quality index and a fourth quality index indicating a signal-to-interference noise power ratio of the reference signal, and
obtaining radiowave quality of the wireless link based on the signal-to-interference noise power ratio of the reference signal received from wireless station.

10. A control method comprising:
calculating, by a first wireless station or a network device, an available bandwidth in a wireless link between the first wireless station and a second wireless station by:
obtaining a bandwidth for the wireless link between the first wireless station and the second wireless station based on a first quality index indicating total received power measured at the first wireless station, a second quality index indicating received power of a reference signal received from the second wireless station, and a third quality index indicating received quality of the reference signal, obtaining a radio resource usage rate which is a ratio of a number of frequency blocks used for signal transfer, to a plurality of frequency blocks constituting the bandwidth based on the third quality index and a fourth quality index indicating a signal-to-interference noise power ratio of the reference signal, and obtaining radiowave quality of the wireless link based on the signal-to-interference noise power ratio of the reference signal received from the second wireless station.

11. A non-transitory computer-readable storage medium storing a program when executed by a processor to cause a computer to:

calculate an available bandwidth in a wireless link between a first wireless station and a second wireless station by:

obtaining a bandwidth for the wireless link between the first wireless station and the second wireless station based on a first quality index indicating total received power measured at the first wireless station, a second quality index indicating received power of a reference signal received from wireless station, and a third quality index indicating received quality of the reference signal, obtaining a radio resource usage rate which is a ratio of a number of frequency blocks used for signal transfer, to a plurality of frequency blocks constituting the bandwidth based on the third quality index and a fourth quality index indicating a signal-to-interference noise power ratio of the reference signal, and obtaining radiowave quality of the wireless link based on the signal-to-interference noise power ratio of the reference signal received from wireless station.

* * * * *

UNITED STATES PATENT AND TRADEMARK OFFICE
CERTIFICATE OF CORRECTION

PATENT NO. : 10,779,279 B2
APPLICATION NO. : 16/091589
DATED : September 15, 2020
INVENTOR(S) : Eiji Takahashi and Kosei Kobayashi Page 1 of 1

It is certified that error appears in the above-identified patent and that said Letters Patent is hereby corrected as shown below:

In the Claims

Column 20, Line 39; In Claim 9, after "and", insert --the second--

Column 20, Line 44; In Claim 9, after "from", insert --the second--

Column 20, Line 55; In Claim 9, after "from", insert --the second--

Column 22, Line 4; In Claim 11, after "from", insert --the second--

Column 22, Line 16; In Claim 11, after "from", insert --the second--

Signed and Sealed this
Eighth Day of December, 2020

Andrei Iancu
*Director of the United States Patent and Trademark Office*